United States Patent [19]
Smith et al.

[11] 3,831,255
[45] Aug. 27, 1974

[54] APPARATUS AND METHOD FOR FORMING SHAPED INSULATORS

[75] Inventors: Dallas F. Smith; Richard B. Arnold, both of Fort Wayne, Ind.

[73] Assignee: General Electric Company, Fort Wayne, Ind.

[22] Filed: June 25, 1973

[21] Appl. No.: 373,129

Related U.S. Application Data

[62] Division of Ser. No. 119,618, March 1, 1971, Pat. No. 3,742,596.

[52] U.S. Cl. ................................. 29/205 E, 93/1 R
[51] Int. Cl. .......................................... H02k 15/00
[58] Field of Search .......... 29/205 R, 205 E, 205 C, 29/205 CM, 596; 93/1 R

[56] References Cited
UNITED STATES PATENTS

| | | | |
|---|---|---|---|
| 1,479,248 | 1/1924 | Moore | 29/205 E X |
| 1,720,923 | 7/1929 | Poole | 29/205 E X |
| 3,254,394 | 6/1966 | Roberts | 29/205 E X |
| 3,579,818 | 5/1971 | Arnold et al. | 29/205 D X |

*Primary Examiner*—Roy Lake
*Assistant Examiner*—James F. Coan

[57] ABSTRACT

Method and apparatus for forming shaped insulators and for developing coil turns into coil groups and inserting the insulators and coils into preselected slots of a magnetic core. The insulators are automatically formed at an insulator-forming station by an assembly including control mechanism for providing a series of insulators corresponding to predetermined slots of the core. Insulator and coil insertion tooling is movable between the insulator-forming station, to receive formed insulators; the turn-forming station, to receive coil turns; and an insertion station, at which insulators and coil turns are inserted from the insertion tooling into the magnetic core.

The insulator and coil insertion tooling is mounted for pivotal movement about a horizontal axis so that it swings through a generally vertical plane. The insulator-forming station, the turn-forming station and the insertion station intersect this plane. The turn-forming assembly and the tooling are aligned during coil turn generation and some previously generated turns are received in the tooling as other turns are generated. Also the tooling is rotatable, relative to the coil turn-forming assembly, so that turns for each electric phase may be received in the tooling angularly displaced from other phases. Apparatus has two winding head mechanisms for easily generating turns for two phases from different wire. Insulator-forming control mechanisms can be set so that the insulator-forming assembly will provide insulators in predetermined series which correspond to different series of slots of the magnetic core.

4 Claims, 21 Drawing Figures

PATENTED AUG 27 1974 3,831,255

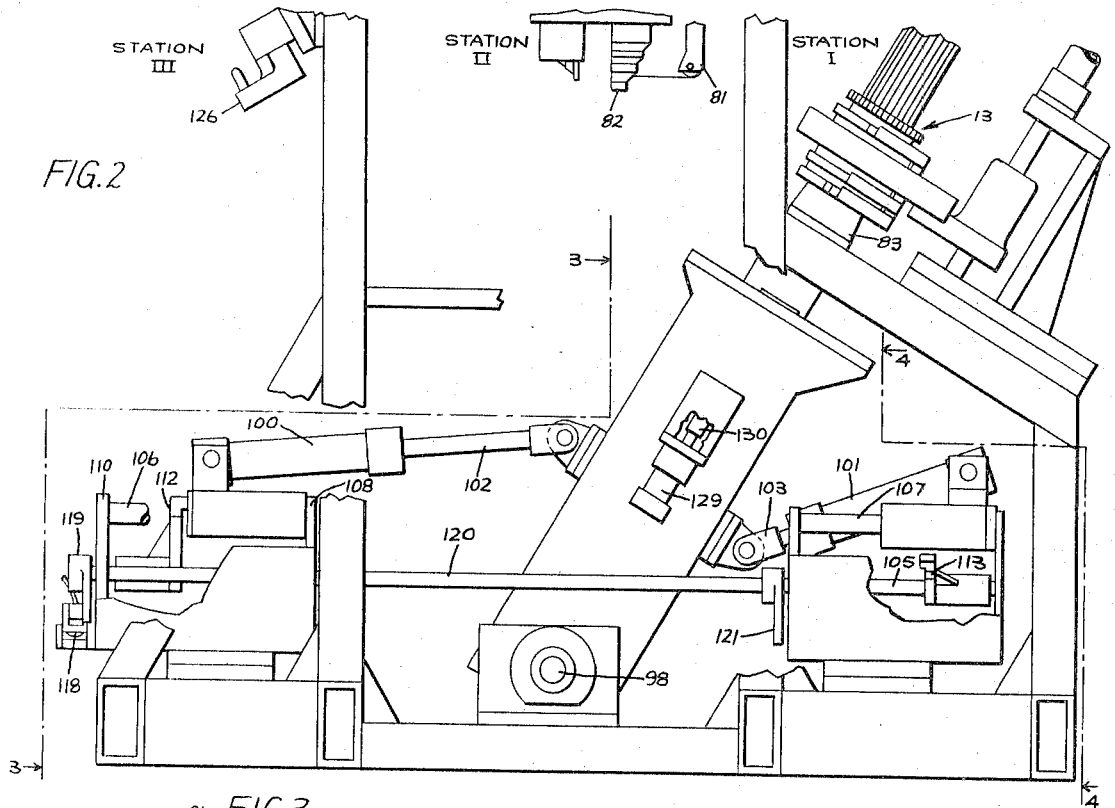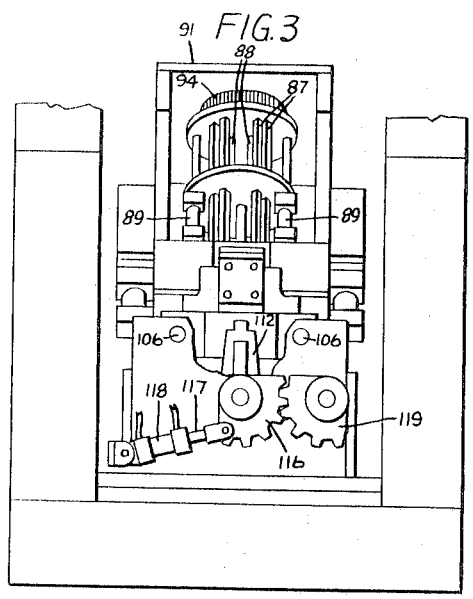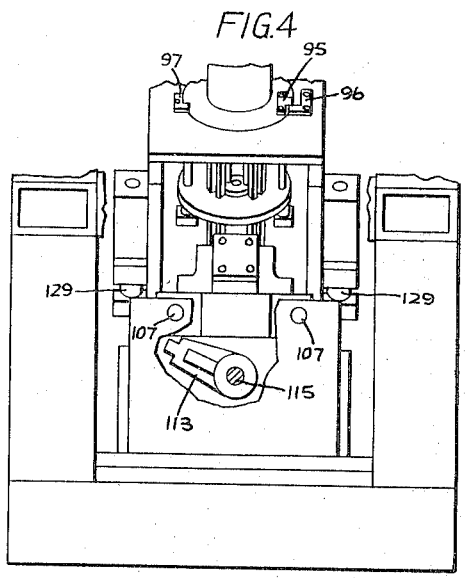

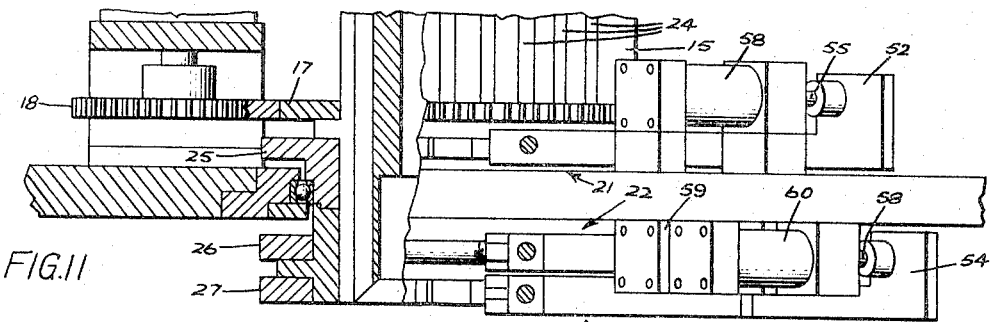
FIG.11
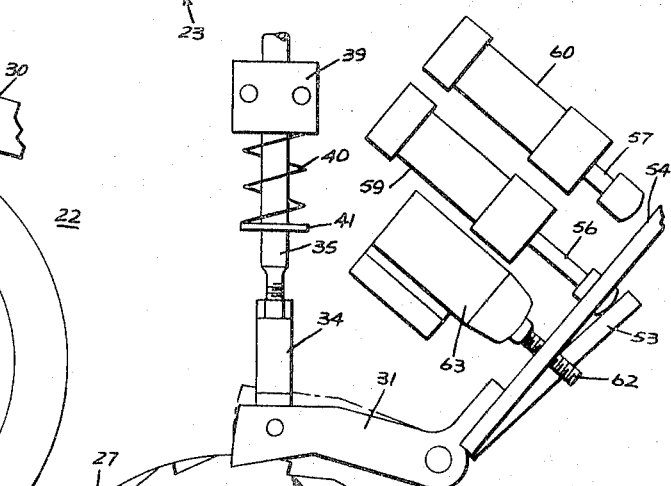
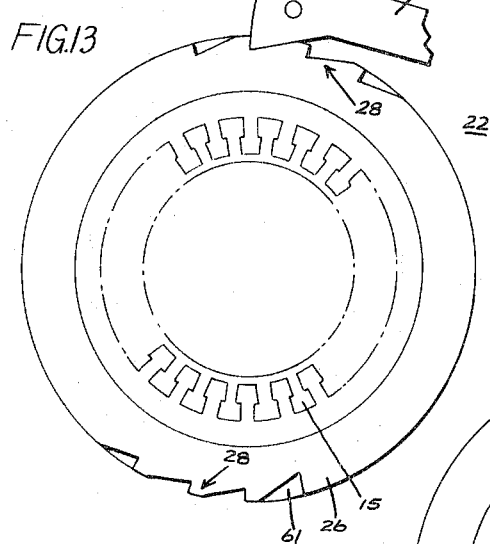
FIG.13
FIG.12
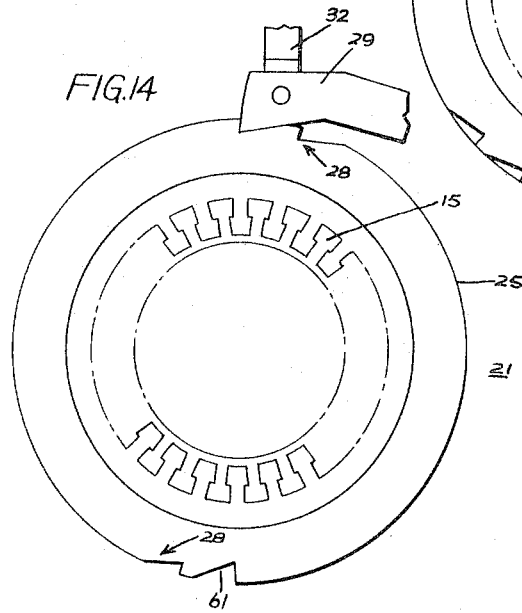
FIG.14

APPARATUS AND METHOD FOR FORMING SHAPED INSULATORS

CROSS REFERENCE TO RELATED APPLICATIONS AND PATENTS

This application is a division of our application Ser. No. 119,618 which was filed Mar. 1, 1971, and titled Apparatus And Method For Forming Shaped Insulators And For Developing Coils For Inserting Insulators And Coils Into A Magnetic Core and which issued U.S. Pat. No. 3,742,596 on July 3, 1973.

The following copending application or patents which were copending with the parent of the present application, and assigned to the same assignee as the present invention, are expressly incorporated by reference in the present application: Method And Apparatus For Forming Shaped Insulators And For Developing Coils Of A Magnetic Core, Richard B. Arnold and Dallas F. Smith, U.S. Pat. No. 3,579,818, dated May 25, 1971; Apparatus For Inserting Insulators And Coil Turns Into The Slots Of A Magnetic Core, Richard B. Arnold, Ser. No. 101,638 filed Dec. 28, 1970 now U.S. Pat. No. 3,722,063; Coil Developing Apparatus, Richard B. Arnold, U.S. Pat. No. 3,579,791, dated May 25, 1971; Coil Developing Apparatus, Richard B. Arnold, U.S. Pat. No. 3,672,027 dated June 27, 1972; and Method Of Developing Coils Of A Coil Group For A Magnetic Core, Richard B. Arnold, U.S. Pat. No. 3,672,040, dated June 27, 1972.

BACKGROUND OF THE INVENTION

The present invention relates to improved apparatus and methods for forming insulators for an electromagnetic device.

It is an object of the present invention to provide new and improved methods and apparatus for forming insulators for an electromagnetic device.

A further, more specific, object of the present invention is to provide improved method and apparatus for forming a series of insulators for a slotted magnetic core.

A more specific object of the invention is to provide such an improved insulator-forming method and apparatus which selectively will provide different series of insulators.

SUMMARY OF THE INVENTION

In carrying out the above and other objects, in one form of our invention, there is provided a new and improved method and apparatus for forming insulators for electromagnetic devices. Subsequently such insulators and coils are inserted into predetermined slots of a magnetic core. This is accomplished, in an illustrated approach, with apparatus that includes insulator and coil insertion tooling that receives insulators and coils and subsequently effects insertion of the received insulators and coils into predetermined slots of a magnetic core.

Such apparatus includes a first station having insulator-forming means; a second station having turn generation means; and a third station at which insulators and coils previously received in the tooling are inserted into the core. There is means for moving the insulator and coil insertion tooling between the first, second and third stations, with the tooling being disposed at an angle to the vertical when it is at at least one of the stations.

The exemplified insulator-forming means includes an insulator-receiving mechanism having slots corresponding to the slots of a slotted magnetic core and severing means operable to cyclically sever a length from a strip of insulative material and introduce the severed length into a slot of the insulator-receiving mechanism. There is a drive means for moving the insulator-receiving mechanism to bring the slots of the mechanism sequentially in aligneent with the severing means. There also are at least first and second control mechanisms, with each control mechanism being effective when operative to repeatedly halt the insulator-receiving mechanism with a corresponding series of insulator-receiving slots in alignment with the severing means. The series of slots related to at least one of the control mechanisms is different than the series of insulator-receiving slots related to the other of the control mechanisms. There is selector means effective to determine which of the control mechanisms is operative at any given time.

BRIEF DESCRIPTION OF THE DRAWINGS

The subject matter which we regard as our invention is particularly pointed out and distinctly claimed in the concluding portion of the specification. The invention itself, however, together with further objects and advantages thereof may be better understood by reference to the following description taken in conjunction with the accompanying drawings in which like numerals identify like components, and in which:

FIG. 2 is a side elevational view of the apparatus of FIG. 1, but with the insulator and coil insertion tooling in another position, the view being somewhat schematic in form and with certain parts omitted for purposes of illustration;

FIG. 3 is a view generally as seen along line 3—3 in FIG. 2;

FIG. 4 is a view generally as seen along line 4—4 in FIG. 2;

FIG. 11 is a somewhat schematic partial side view, partly in section, illustrating certain components of an insulator-forming apparatus according to one aspect of the present invention;

FIG. 12 is a partial bottom view of the apparatus of FIG. 11, illustrating certain features of one control mechanism;

FIG. 13 is a view similar to FIG. 12 but illustrating certain features of another control mechanism included in the insulator-forming apparatus;

FIG. 14 is a view similar to FIG. 12 but illustrating certain features of yet another control mechanism included in the insulator-forming apparatus;

DESCRIPTION OF THE PREFERRED EMBODIMENTS

Figure 1:
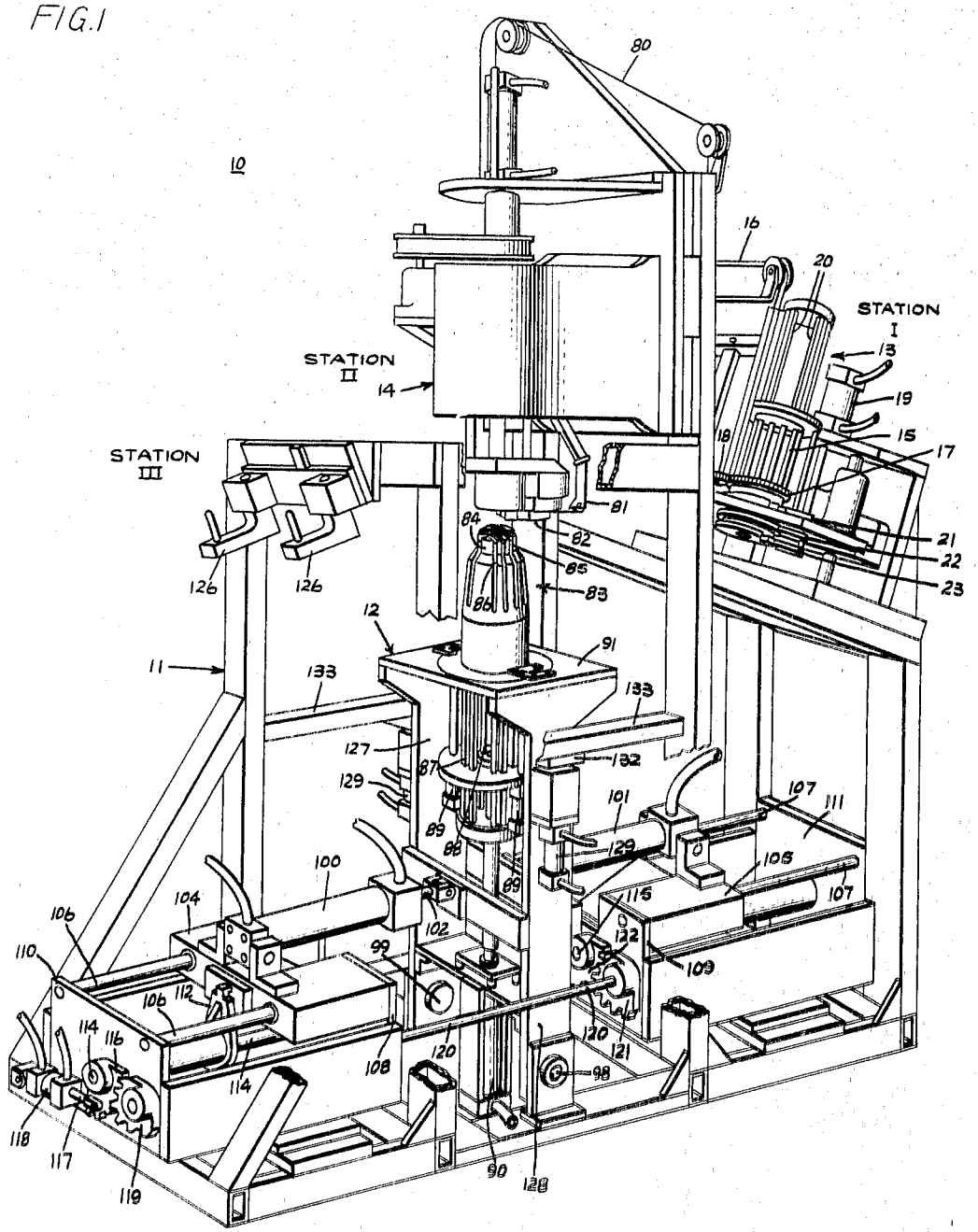
FIG. 1 is a perspective view of an apparatus, embodying one form of the present invention, for forming shaped insulators, for developing coil turns into coil groups and for inserting insulators and coils into slots of a magnetic core, the view being somewhat schematic in form and with certain parts omitted for purposes of illustration.

Referring now to the drawings, and particularly to FIGS. 1-10, there is illustrated a new and improved apparatus for forming shaped insulators, for developing coil turns of electrically conductive wire into coil groups and for inserting insulators and coils into predetermined slots of magnetic cores. The drawings are somewhat schematic in form and some parts have been omitted for purposes of illustration. One advantage of the arrangement and structure herein taught is that a number of proven components may be utilized in a highly effective manner. Thus some of the components of the overall apparatus 10 are well-known. The apparatus includes a frame generally indicated at 11 which conveniently may be constructed of hollow metal members and serves as a support for various operative components of the apparatus. The insulator and coil insertion apparatus includes insulator and coil insertion tooling generally indicated at 12 for receiving insulators and coils therein and subsequently effecting insertion of the received insulators and coils into predetermined slots of a magnetic core. The tooling 12 is movable between Station I which includes insulator-forming means 13 for forming insulators in a predetermined pattern; Station II which includes turn-generating means 14 for generating turns of electrically conductive wire; and Station III at which insulators and coils previously received in the insertion tooling 12 are inserted into a magnetic core.

The illustrated insulator-forming means 13 at Station I may conveniently be of the general type shown and described in the aforementioned U.S. Pat. No. 3,579,818. Such a means includes a magazine 15 having a plurality of slots therein to receive insulators of predetermined lengths which have been severed from a continuous strip 16 of insulating material such as polyethylene terephthalate, paper, or the like, in a predetermined selected series.

The magazine is connected to a geared wheel 17 which is selectively driven from a powered gear 18 for rotating the magazine 15 to move various slots of the magazine 15 into position to receive insulators. The insulator-forming means 13 also includes a power means 19, in the form of a hydraulic cylinder, for moving the magazine 15 and its associated components axially relative to the insertion tooling 12 to place the magazine in position for inserting previously formed insulators from the magazine into the insulator and coil insertion tooling 12. The insulator-forming means 13 also includes a number of rods or pushers 20 which are axially movable relative to the magazine for transferring formed insulators from the magazine into the insulator and coil insertion tooling 12. Control mechanisms 21, 22, and 23 are also included in the insulator-forming means 13 to selectively control the rotation of the magazine for presenting different predetermined series of the slots of the magazine to receive insulators for selectively varying the pattern of insulators.

Generally as indicated in FIG. 11, the magazine 15 is rotated by gear 18 through gear wheel 17 to bring various insulator-receiving slots 24 into alignment with a severing means (such as that shown and described in the aforementioned patent 3,579,818.) The severing means is operable to cyclically sever a length from the strip 16 of insulation material and introduces the severed length into an appropriate slot in the insulator-receiving mechanism or magazine 15. The control mechanisms 21, 22, and 23 are effective, when operative, to repeatedly halt the magazine with a corresponding series of insulator-receiving slots 24 in alignment with the severing means.

The control mechanisms 21-23 include a plurality of disc means such as plates 25, 26, and 27, respectively, which are mounted to the magazine 15 in an axially stacked manner and are connected to the magazine to rotate therewith. Each of the plates is provided with a series of openings 28, with each of the plates having two such series located on angularly opposite sides of the plates, in the illustrated exemplification. With such series the magazine is repeatedly stopped to provide insulators in magazine slots 24 which correspond to positions for insulators in a stator for a two pole electric motor. It will be understood that the series of recesses 28 may be provided in other arrangements so as to distribute insulators in the magazine 15 in patterns which are suitable for other forms of motors.

Comparing FIGS. 12-14 it will be seen that each series of recesses 28 in plate 25 includes two recesses each and the series in plate 27 includes six recesses each. Thus, when control mechanism 21 is operative there will be provided a total of four insulators, while control mechanism 22 being operative will provide a total of eight insulators, and control mechanism 23 being operative will provide a total of 12 insulators. When the insulator-forming means 13 is energized, the gear 18, acting through the geared wheel 17, tends to continuously rotate the magazine 15. However, the recesses 28 of the operative control mechanism cooperate with a corresponding dog 29, 30, or 31 respectively to repeatedly stop the magazine at positions corresponding to each of the selected recesses to align a corresponding slot in the magazine with the severing means.

Each of the dogs 29–31 is connected to an actuator 32, 33, and 34, respectively. Each of the actuators is connected by one of the elongated rods 35 to a slide block 36, 37, and 38, respectively. Each of the rods 35 extends through a guide block 39 and is biased to a position engaging its associated dog with a recess in the corresponding plate by means of spring 40, which is positioned between a guide block 39 and a washer 41 mounted to that rod.

Figure 15:
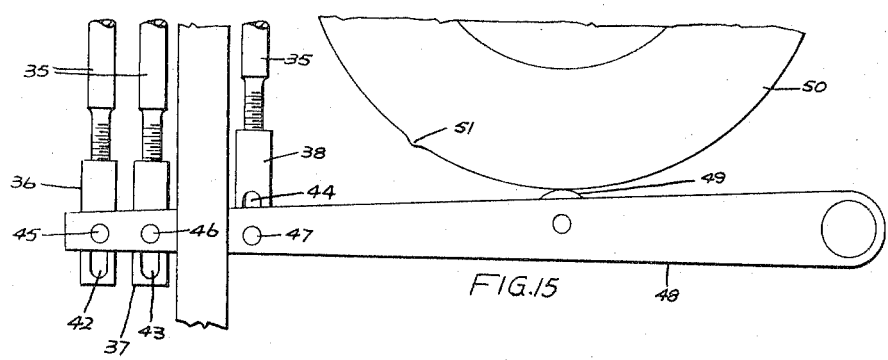
FIG. 15 is a fragmentary elevational view illustrating other components of the insulator-forming apparatus.

As seen in FIG. 15, each of the slide blocks 36–38 is provided with an elongated slot 42, 43, and 44, respectively. The slots receive one of the pins 45, 46 and 47 which is mounted in a pivoted arm 48. The arm 48 also carries a roller 49 which bears against a rotatable cam 50 having an extension 51. Generally as described in the aforementioned U.S. Pat. No. 3,579,818, as the cam 50 rotates, the extension 51 engages the roller 49 and pivots the arm 48 so that the pins move against the bottom of the slots 42–44 (as seen in FIG. 15). This momentarily moves the slide blocks 36–38 downwardly (as seen in FIG. 15). Viewing FIGS. 12–14, this momentary movement of the slide blocks 36–38 momentarily lifts the dogs 29–31 out of the recesses in the associated plates so that the plates, and thus the magazine 15, are free for rotation by the gear 18. Since the arm 48 is moved by the cam only momentarily, the dogs are quickly released and are biased by their associated springs 40 to enter the next recess in their associated plate.

In order that only a selected one of the dogs 29–31 will be effective during the making of a set of insulators, each of the dogs is mounted to an actuating arm 52, 53 and 54 respectively. Each of these arms is positioned to be engaged by a plunger 55, 56 and 57 of a hydraulic cylinder 58, 59 and 60 respectively. When an individual actuating arm 52–54 is engaged by the associated plunger 55–57 the corresponding dog is held out of engagement with the associated plate 25–27 and the associated slide block 36–38 is held in its downward position (as seen in FIG. 15) so that movement of the arm 48 will not effect that dog.

From FIGS. 11–15 it will be seen that the cylinders 58–60 are illustrated as being set so that the control mechanism 23, including dog 31 and plate 27, is effective to determine the pattern of insulators. It will be seen that each of the plates 25–27 has one recess 61 which is deeper than the remaining recesses. Assuming that the control mechanism including a particular plate is effective for controlling the insulation pattern; when the associated dog is received in the recess 61, a set screw 62 (carried by the associated actuating arm) engages a micro switch 63. This is effective to de-energize the insulation forming mechanism.

Figure 16:
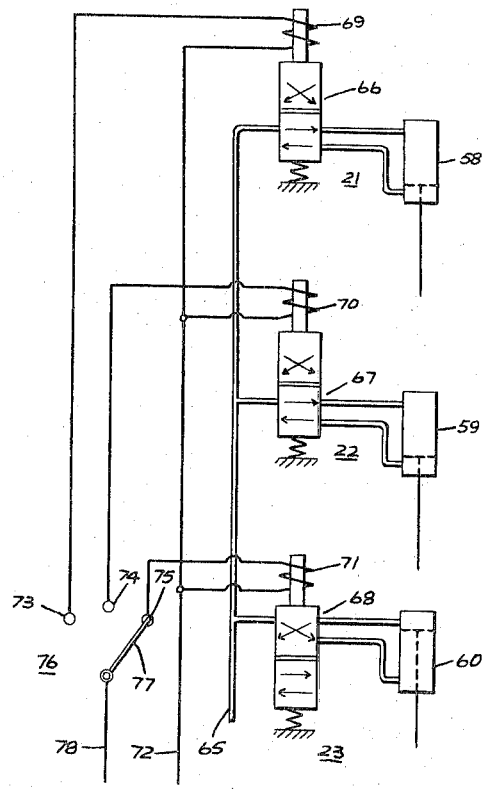
FIG. 16 is a schematic diagram of a hydraulic circuit for selectively activating the control mechanisms of FIGS. 12-15.

Referring to FIG. 16 there is shown in schematic form a selection means for determining which of the control mechanisms is effective at any given time. A hydraulic supply line 65 is connected to a suitable source of hydraulic pressure (not shown) and is connected to each of the hydraulic cylinders 58–60 through two-way valves 66–68 respectively. Each of the valves 68 includes a solenoid actuator represented by the coils 69–71 respectively with one side of each coil being connected to an electrical supply conductor 72. The other side of each of the coils 69–71 is connected to one of the stationary contacts 73, 74, and 75 respectively, of a selector switch 76 which also has a movable contact 77 connected to another electrical supply conductor 78. With the switch in the position shown, only coil 71 is connected to the electrical supply and the two-way valve 68 is in the opposite position than the valves 66 and 67. Thus the hydraulic cylinder 60 is in the opposite position than the other two hydraulic cylinders to make control mechanism 23 effective for determining the insulation pattern. When it is desired to have control mechanism 22 effective to determine the insulator pattern, movable contact 77 is engaged with stationary contact 74 and, in a similar manner, when control mechanism 21 is to determine the insulator pattern the movable contact 77 is engaged with stationary contact 73.

Referring again to FIG. 1, the turn-generating means 14 conveniently may be such as that shown and described in the aforementioned U.S. Pat. No. 3,672,027, in which wire 80 is fed to a flyer 81 from which it is wound about a stepped, noncollapsing winding head or form 82. Details of the various components of this turn-generating means are fully disclosed in U.S. Pat. No. 3,672,027 and will not be repeated herein. It will be understood that, assuming that the insulator and coil insertion tooling 12 is positioned in alignment with the winding head 82, turns of wire for the predetermined coils will be generated about the winding head and will be moved from the winding head into the injection tooling.

The coil and turn injection tooling illustrated in FIGS. 1–10 and FIG. 17 may be basically the same as that shown and described in application Ser. No. 101,638 for example. Such tooling includes a head 83 with a divider blade section 84 and coil turn feeder blades 85 mounted therein. As is described in the aforementioned application Ser. No. 101,638, there are slots between the divider blade section and each of the coil turn feeder blades to receive the turns for the coils. The coil turn feeder blades form a turn pusher device for inserting the coils into a slotted structure such as a magnetic core. The head 83 also includes a number of slots 86 to receive insulators from the insulator-forming means 13. The insulator and coil insertion tooling 12 also includes insulator pushers 87 and actuator rods 88 for effecting insertion of previously received insulators and coils from the tooling into a suitable magnetic core. The insulator pushers 87 and actuator rods 88 may be moved by any suitable power means such as the hydraulic cylinders 89 and 90, by way of illustration.

Figure 17:
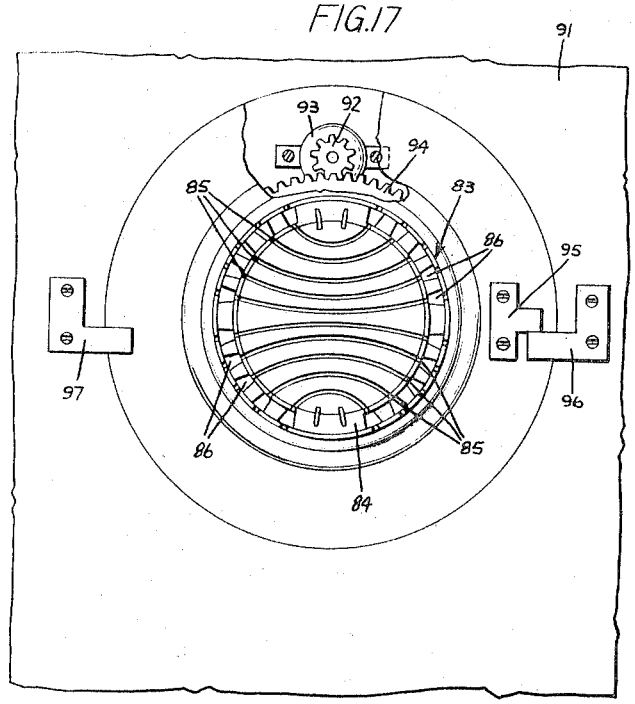
FIG. 17 is a fragmentary plan view of the insertion tooling used in the mechanism illustrated in FIG. 1.

As best seen in FIG. 17, the head 83 is rotatably mounted on plate 91. Head 83 is rotated by a gear 92 which is driven by hydraulic motor 93 and meshes with gear teeth 94 formed integrally with the head 83. A tab or finger 95 is mounted on the head to selectively engage a pair of stops 96 and 97 which are mounted on the plate 91 on angularly opposite sides of the head 83. Thus, when the gear 92 drives the head 83 in a clockwise direction (as seen in FIG. 17) the tab 95 comes into contact with the stop 96 to position the head as shown in FIG. 17. On the other hand, when the gear 92 drives the head in the opposite or counterclockwise direction the tab 95 comes into engagement with the stop 97 to position the head in an orientation which is rotated 180° from that shown in FIG. 17. It will be understood that the two stop positioning arrangement is illustrated since the head 83 is formed to receive and then insert into a magnetic core insulators and coils for a two pole motor.

It will also be understood that the drive and stop mechanism is provided to rotate the insulator and coil insertion tooling relative to the insulator-forming means and the turn-generating means to position appropriate slots in alignment with these means for receiving the insulators and coils in the tooling in the proper orientation for insertion into a particular magentic core. Thus when the coil and turn injection tooling used is designed with other slot arrangements, such as those suitable for use with a four pole or six pole motor stator, for instance, the drive and stop mechanism will be suitable modified to provide the appropriate tooling rotation.

Figure 5:
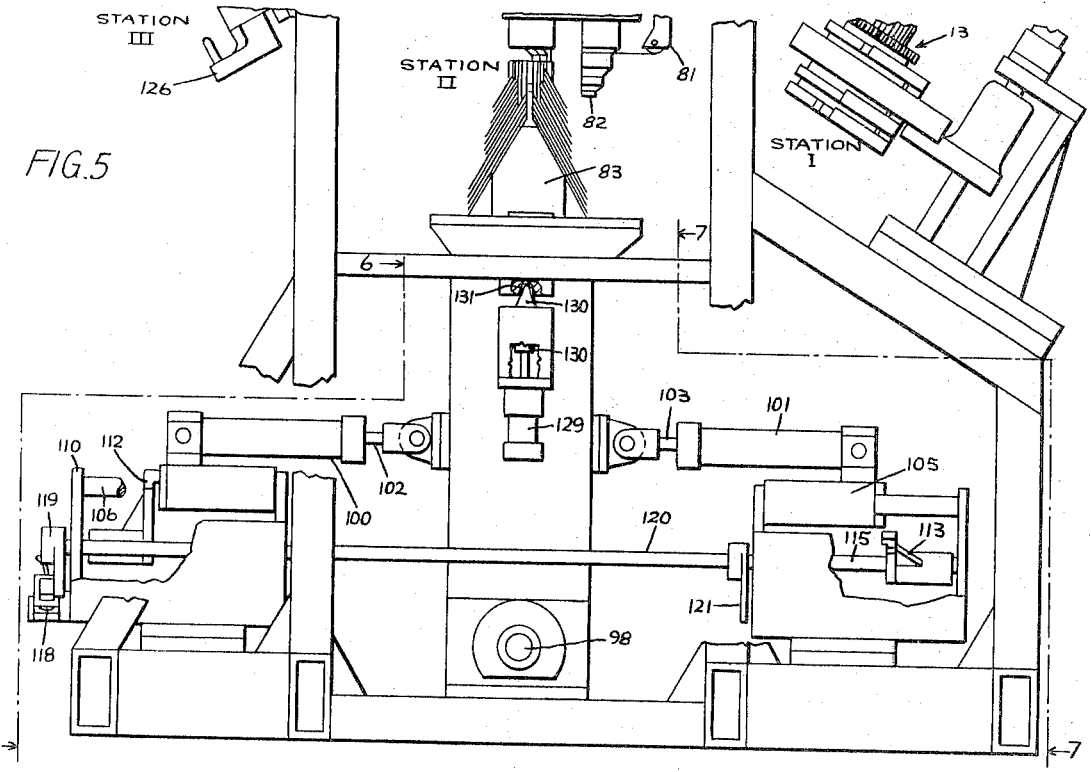
FIG. 5 is a side elevational view similar to FIG. 2, but showing the insulator and coil insertion tooling in the position of FIG. 1.
Figure 6:
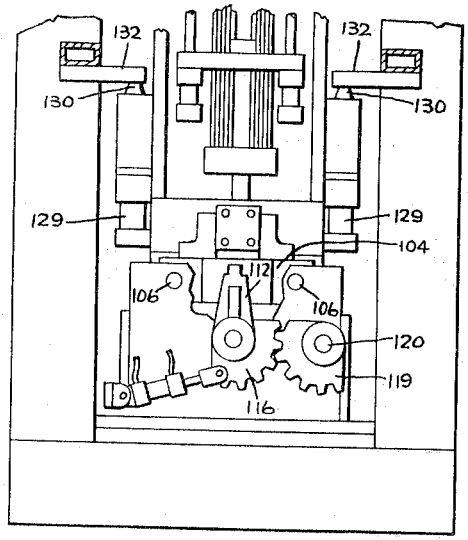
FIG. 6 is a view generally as seen along line 6—6 in FIG. 5.
Figure 7:
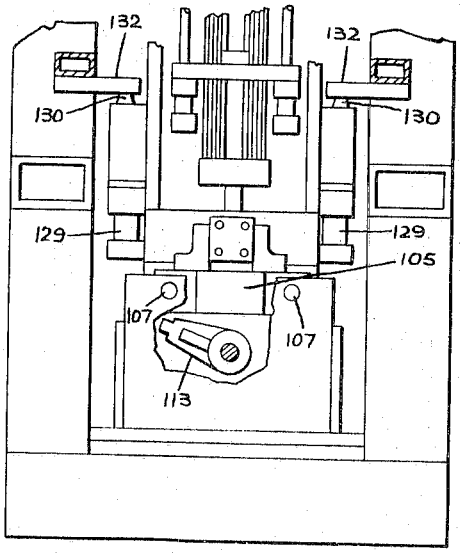
FIG. 7 is a view generally as seen along line 7—7 in FIG. 5.
Figure 8:
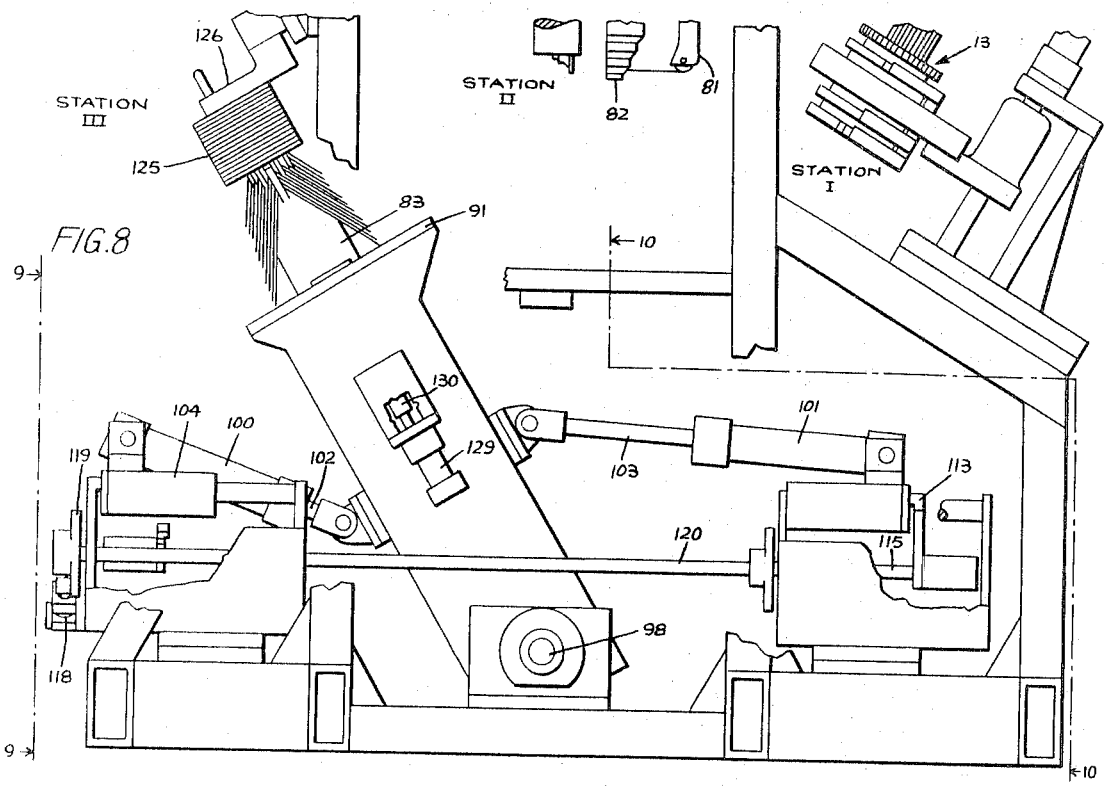
FIG. 8 is a side elevational view similar to FIG. 2, but showing the insulator and coil insertion tooling in yet another position.
Figure 9:
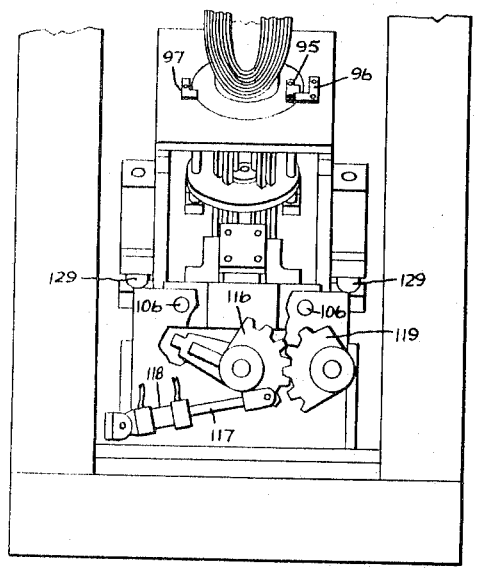
FIG. 9 is a view generally as seen along line 9—9 in FIG. 8.
Figure 10:
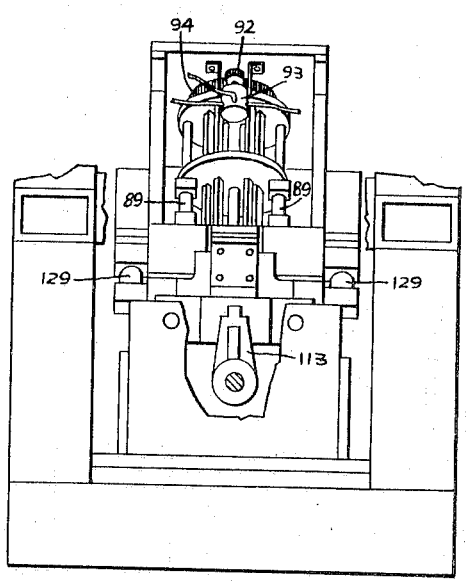
FIG. 10 is a view generally as seen along line 10—10 in FIG. 8.

The apparatus is utilized in order to form suitable insulators in an appropriate pattern, insert them into appropriate slots in the insulator and coil insertion tooling, to generate turns for the desired coils and receive the generated turns in appropriate slots in the insulator and coil inserting tooling and then to insert the previously received insulators and coils from the inserting tooling into a magnetic core. Assuming coils and insulators have been inserted from the tooling into a core and the core has been removed from the winding head 83, the insertion tooling is first moved to Station I to receive insulators which previously have been formed in the desired pattern. This position is shown in FIG. 2. Then the tooling is moved to Station II for the generation of turns and receipt of those turns into the tooling. This is illustrated in FIG. 5. The tooling then is moved to Station III where a suitable magnetic core is placed on the head 83 and the previously received turns and coils are inserted into the core. This is illustrated in FIG. 8.

As the insertion tooling is moved between Stations I, II and III, it swings through a generally vertical plane (e.g., along a path lying in a generally vertical plane) with the insulator-forming means and the turn-generating means intersecting this plane. To this end the plate 91, on which head 83 is rotatably mounted, is pivotally mounted to the frame by trunnions 98 and 99. The trunnions are positioned so that the insulator and coil insertion tooling pivot about a horizontal axis between the various stations. The tooling is moved between the stations by a pair of hydraulic cylinders 100 and 101. Piston 102 for cylinder 100 is connected to the one side of the insertion tooling 12 while the piston 103 for cylinder 101 is connected to the other side of the insertion tooling. The cylinder 101 is pivotally mounted to a guide block mechanism 104 which, in turn, is slidably mounted on a pair of guide rods or rails 106. Hydraulic cylinder 103 is pivotally mounted to a similar guide block mechanism 105 which is mounted on a set of guide rods or rails 107. At the inner end of their travel, the guide block mechanisms 104 and 105 engage and are stopped by plates 108 and 109 respectively, which from part of the frame 11. At their outer extremity of travel, the guide blocks engage and are stopped by plates 110 and 111 respectively, which also form part of the frame 11.

In order to positively restrain the guide blocks and thus the hydraulic cylinders from moving from their inner position to their outer position there is provided a pair of rotatable stops 112 and 113 respectively. The stop 112 is mounted on a shaft 114 for rotation therewith and the shaft 141 is rotatably mounted between the plates 108 and 110. Similarly, the stop 113 is mounted on a shaft 115 for rotation therewith and the shaft 115 is rotatably mounted between plates 109 and 111. The shaft 114 extends through the plate 110 and a sector gear 116 is securely mounted to its outer end. This sector gear is connected to the piston 117 of a hydraulic cylinder 118 so that as the cylinder is actuated and moves the piston back and forth, the piston causes rotation of the sector gear and thus shaft 114 and stop 112. Sector gear 116 intermeshes with another sector gear 119, which is mounted for rotation with a shaft 120 that extends from the outside of plate 110 through plates 108 and 109. Another sector gear 121, adjacent plates 109, is mounted on shaft 120 for rotation therewith. The sector gear 121 meshes with an additional sector gear 122 which is mounted for rotation with shaft 115. With this arrangement, when the hydraulic cylinder 118 is actuated, so as to move its piston in one direction or the other, both the stops 112 and 113 are rotated in the same direction. As will be seen by viewing FIGS. 6 and 7 the stops 112 and 113 are angularly offset with respect to each other so that when stop 112 is in the position shown in FIG. 1 (preventing movement of guide block mechanism 104 toward plate 110), stop 113 is pivoted out of an interfering relationship with guide block mechanism 105 so that it is free to move toward plate 111. Conversely when stop 113 is up (as viewed in the FIGURES) to be in an interfering relationshp with guide block mechanism 105 (preventing its movement toward plate 111) stop 112 is out of interfering relationship with guide block mechanism 104 so that it is free to move toward plate 110.

Viewing FIGS. 1 and 5, in which the insulator and coil insertion tooling 12 is at Station II and in alignment with turn-generating means 14; and assuming it is desired to move the tooling to Station I where it is in alignment with the insulator-forming means (as seen in FIG 2), hydraulic cylinder 100 is energized to extend piston 102. This causes the insertion tooling 12 to pivot about the trunnions 98 and 99 until the tooling comes into alignment with the insulator-forming means. At this time the hydraulic piston 101 has collapsed downwardly and guide block mechanism 105 engages plate 111 to positively stop movement of the insertion tooling. During this movement stop 112 is in interfering relationship with guide block mechanism 104 to provide a firm base from which cylinder 101 can act. This positively positions head 83 in proper alignment with the magazine 15.

After predetermined numbers of insulators in a selected pattern have been inserted into the tooling from the insulation forming means the tooling is pivoted from the position of FIG. 2 (Station I) to the position of FIGS. 1 and 5 (Station II), at which the tooling head 83 is aligned with the winding head or form 82. To accomplish this, the hydraulic cylinder 100 is actuated in the reverse direction to retract piston 102. Engagement of guide block mechanism 104 with plate 108 provides a stable base from which the hydraulic piston 100 operates during this movement.

While the tooling head 83 is aligned with the winding head 82, a predetermined number of turns are generated about winding head 82 and are received in appropriate slots in the head 83. It will be understood that, after some turns are generated and received to form coils for one pole, the head 83 may be rotated to dispose other of its slots in alignment with winding head 82 to form coils for another pole or poles.

The insulator and coil insertion tooling then is moved from the position of FIGS. 1 and 5 (Station II) to that of FIG. 8 (Station III). First the hydraulic cylinder 118 is actuated to retract piston 117 and thus change the positions of stops 112 and 113 so that stop 112 is in a non-interfering relationship with guide block mechanism 104, and stop 113 is in an interfering relationship with guide block mechanism 105. Then hydraulic cylinder 101 is energized to extend piston 103. This pivots the insulator and coil insertion tooling about the trunnions 98 and 99 causing the guide block mechanism 104 to slide along the rails 106 until it engages plate 110 and causing the cylinder 100 to pivot downwardly until it engages the guide block mechanism 104. At this time the insertion tooling is positively stopped in the position shown in FIG. 8, that is at Station III. At this time, in normal operation, the insulators and coils having been positioned in the appropriate slots of the insertion tooling, a magnetic core such as that shown at 125 is placed over the divider blade section 84, and a pair of stops 126 are manually pivoted over the top of the core to hole the core on the tooling. Then the insulator pushers 87 and actuator rods 88 are moved upwardly as in a manner described in the aforementioned application Ser. No. 101,638 now U.S. Pat. No. 3,722,063 to insert the insulators and coils into the core. Thereafter the stops 126 may be pivoted out of alignment with the core and the core removed from the insertion tooling. At this time the tooling is again ready to receive insulators and coils.

The first step in moving the tooling back to Station I is provided by energizing the cylinder 101 to retract the piston 103. This pivots the tooling from the position of FIG. 8 to the position of FIGS. 1 and 5. During this operation the stop 113 engages guide block mechanism 105 to provide a stable base from which the piston acts. Then, as previously described, to go from Station II to Station I, hydraulic cylinder 118 is first energized to return the stops to their other positions and then hydraulic cylinder 100 is energized to extend piston 102.

The plates 108, 109, 110, and 111, the stops 112 and 113, and the guide block mechanism 104 and 105, in addition to providing stable bases for the cylinders 100 and 101 in moving the insertion tooling between the stations, also provide means for positively stopping the tooling at Station I with the slots 86 in alignment with corresponding slots of magazine 15; and at Station III with the head 83 positioned to receive a core 125. To provide a similar positive holding arrangement at Station II, so that the slots formed in the head 83 by the divider blade section 84 and coil turn feeder blades 85 are properly aligned to receive the turns of wire generated about the winding head 82, the side members 127 and 128 of the insulator and coil insertion tooling are provided with hydraulic cylinders 129. The distal end of the pistons 130 for these cylinders are tapered to a wedge shape to be received in a similarly shaped slot 131 provided in a plate 132. Each of the plates 132 is mounted on a horizontal beam 133 which forms part of the frame 11. Thus the pistons 130 and slots 131 assure a positive positioning of the insertion tooling when in Station II.

It will be understood that the apparatus just described provides a number of advantages. For instance, pivoting the coil and insulator tooling to swing through a vertical plane with the mechanisms at the various stations intersecting this plane and with the insertion tooling being disposed at an angle to the vertical when it is at at least one station (Stations I and III in the exemplification) provides a rugged yet compact apparatus. Also the tooling is properly aligned at each station and proven components can be utilized.

Figure 18:
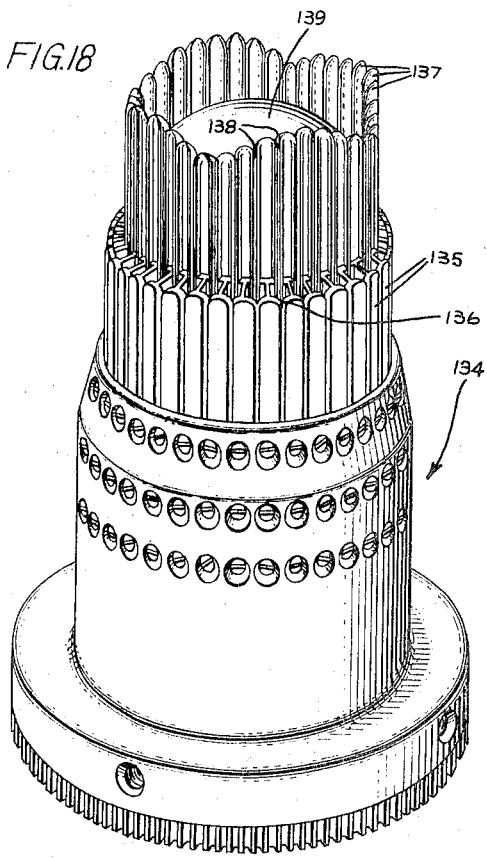
FIG. 18 is a partial perspective view of another form of insertion tooling useful in the present invention.

Turning now to FIG. 18 there is shown another head 134 which may be utilized as part of the insulation and coil insertion tooling 12 in place of head 83. The head 134 includes a plurality of insulator guides 135 forming insulator receiving slots 136 between each adjacent pair of insulator guides. Each of the insulator guides 135 mates with one of a plurality of spaced apart fingers or coil turn guides 137. Each adjacent pair of coil turn guides form a coil turn receiving slot or aperture 138 therebetween. Within the fingers 137 there is provided a turn pusher device in the form of a stripper head 139. The stripper head 139 may have fingers which extend into the coil receiving slots 138 to remove the turns for various coils from between the coil turn guides 137. The head 134 is particularly useful where it is desired to provide different coils of different size wire, as in motors having start and run windings, and where it is desired to process motors having different numbers of poles as the coils for these different numbers of poles may be formed merely by utilizing different ones of the fingers 137. Additional details of a particular coil and insulator-receiving head of this general construction which may be utilized are presented, for example, in U.S. Pat. No. 3,324,536.

Figure 20:
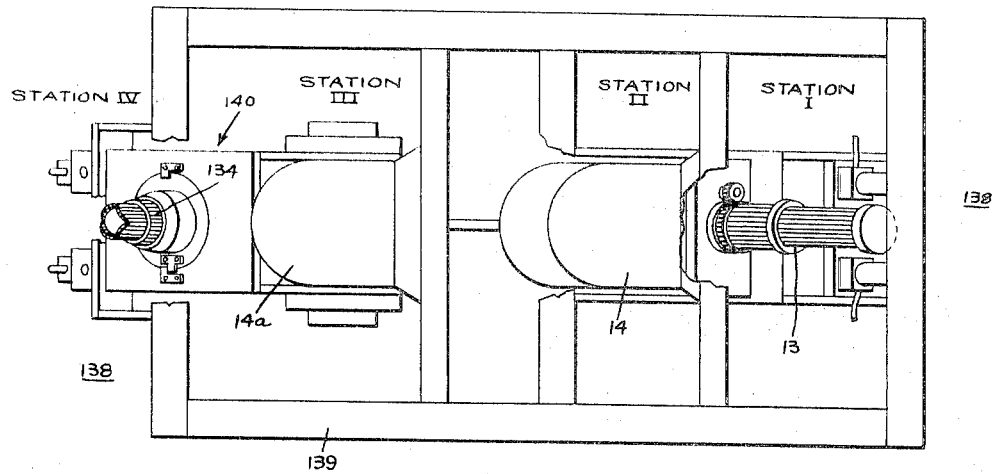
FIG. 20 is a plan view of another apparatus for forming shaped insulators, for developing coil turns into coil groups and for inserting insulators and coils into slots of a magnetic core according to the present invention, the view being schematic in form and with certain parts omitted for purposes of illustration.
Figure 21:
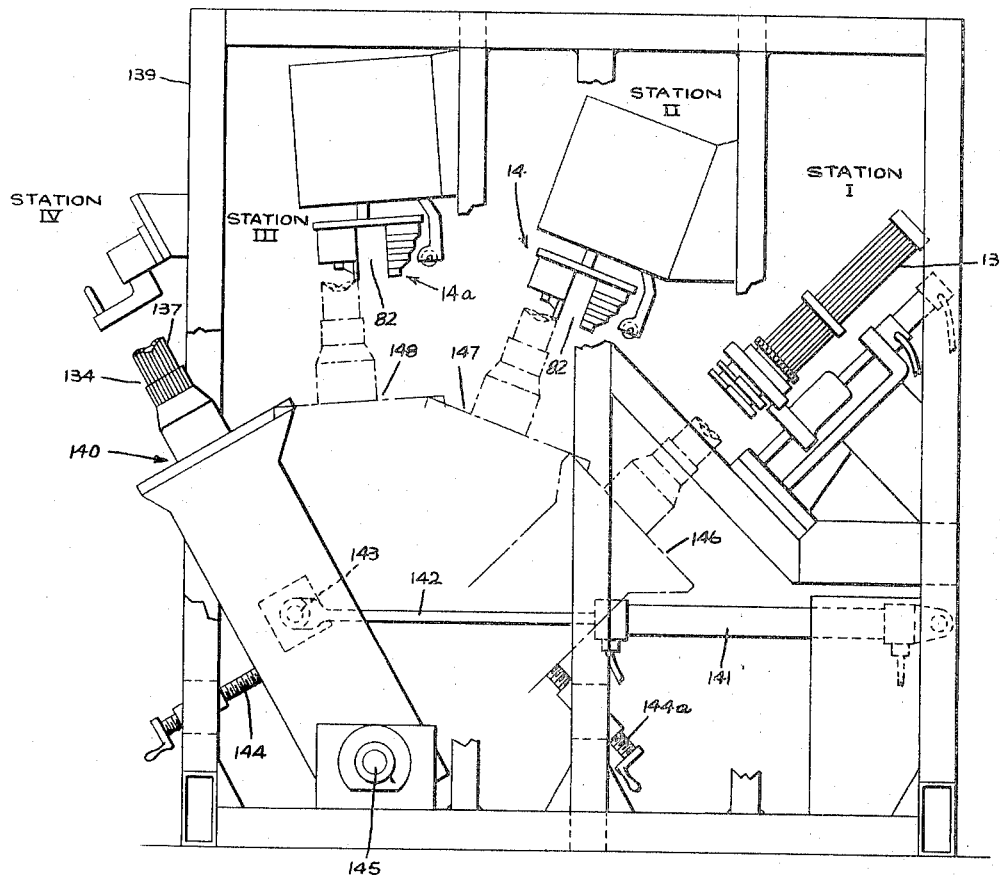
FIG. 21 is a somewhat schematic side elevational view of the apparatus of FIG. 20, illustrating the insulator and coil insertion tooling in various of its positions.

Turning now to FIGS. 20 and 21 there is provided apparatus for inserting insulators and coils of generated turns of electrically conductive wire in predetermined slots of a magnetic core similar to the apparatus of FIGS. 1–10 but particularly adapted to selectively insert coils of different size wire. To this end there is provided a frame 139 forming a Station I at which is mounted an insulator-forming means 13; a Station II at which is mounted a first turn-generating means 14; a Station III at which is mounted a second turn-generating means 14a; and a Station IV at which received insulators and turns are inserted from the insulator and coil insertion tooling 140 into a suitable magnetic core. The turn-generating means 14 and the turn-generating means 14a both may be the same type as turn-generating means 14 at Station II of FIG. 1; but both are provided so that it is not necessary to change the wire supply in order to generate turns of two different sizes of wire.

The tooling 140 is illustrated as including an insertion head 134 as such a tooling head is adapted for easily handling different sizes of wire. Additionally, the insulator and coil inserting apparatus 138, by way of illustration, is modified from that shown in FIGS. 1–10 in that the insulator and coil inserting tooling 140 is moved between the various stations by means of a single hydraulic cylinder 141. The piston 142 of the cylinder 141 is pivotally attached to the tooling at 143. In FIG. 21 the tooling is shown at Station IV where it engages a large set screw or bolt 144 for positively positioning the tooling. As the hydraulic cylinder is actuated to retract the piston 142, the tooling 140 rotates or pivots about trunnions such as that shown at 145 so that it moves through a generally vertical plane which intersects the turn-generating means 14 and 14a and the insulator-forming means 13. When the tooling reaches its other extreme position as indicated by the dashed lines at 146, it engages a second adjustable set screw or bolt 144a which positively positions it with the fingers or guides 137 in alignment with the slots of the insulator magazine. The intermediate positions of the tooling 140 are illustrated by broken lines at 147 and 148, with the guides or fingers 137 in alignment with the winding head 82 of turn-generating means 14 and 14a respectively. Shot pin arrangements similar to cylinders 129, pistons 130, and plates 132 of the apparatus of FIG. 1 may be utilized for properly positioning the tooling at Stations II and III. However, these have not been shown for the sake of simplicity.

It will be understood that the apparatus, including the tooling, shown in FIGS. 20 and 21, is very flexible and advantageous when it is desired to form and insert the insulators and coils for a first phase and for a second phase either simultaneously or serially, particularly when different wire is used for each phase.

In one mode of operation this may be done by moving the tooling 140 first to Station I, at which previously formed insulators are placed in the head 134; then to Station II at which coils for a first phase are received in head 134; into Station IV, where the coils and insulators previously received in the head 134 at Stations I and II are inserted into a magnetic core which would then be removed from the head. Thereafter the tooling 140 would be pivoted back to Station I to receive additional insulators (if desired); then moved to Station III to receive additional coils of another wire (or moved to Station II if desired to receive coils of the same wire); and then moved to Station IV where these insulators and coils are inserted into the magnetic core.

Similarly, the apparatus may be used to insert coils formed of two different wires simultaneously. In such a mode of operation the tooling 140 would first be moved to Station I, if desired, to receive appropriate insulators; then moved to Station II to receive turns of wire for a first set of coils formed from one wire (such as one side or type); then moved to Station III, where turns of another wire are generated and received in the tooling for a second set of coils; and then moved to Station IV where the insulators and all of the coils are inserted into the magnetic core. It will be understood that if desired two sets of coil and insulator inserting tooling could be used, offset from one another. With such an arrangement the insulators and coils could be received in one insertion tooling while previously received coils and insulators were being inserted from the other tooling into a magnetic core.

Figure 19:
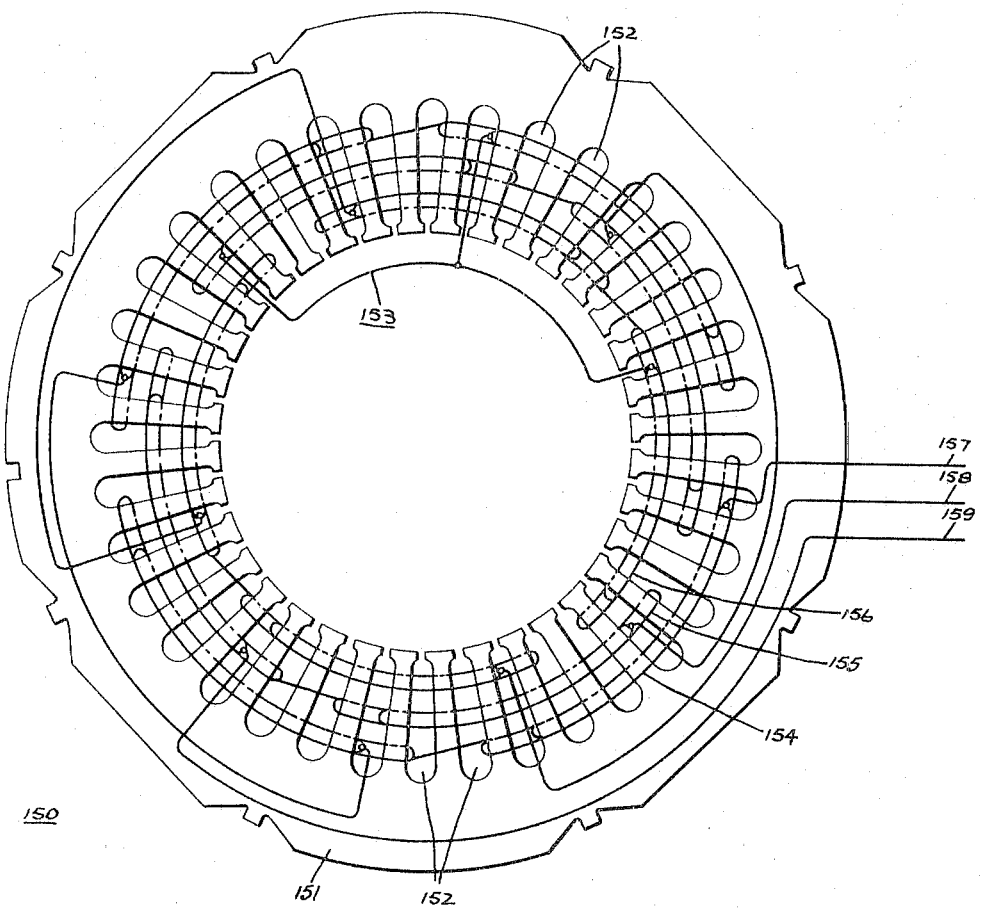
FIG. 19 is a somewhat schematic end view of a four pole, three phase induction electric motor stator which may be manufactured using the tooling of FIG. 18.

Referring now to FIG. 19, there is illustrated by way of example, in schematic form, a polyphase induction stator that includes a winding which may advantageously be formed using the apparatus illustrated in FIGS. 20 and 21. The stator 150 includes a core 151 defining thirty-six equally spaced slots 152. A winding 153, including three phases 154, 155, and 156 is received in the slots 152 and is adapted to be connected to a source of three phase alternating current power through conductors 157, 158, and 159. It will be seen from FIG. 19 that the phase windings are arranged to provide four equal poles. Additional details of this illustrative stator may be had by reference to G. B. Dunn, Jr. U.S. Pat. No. 2,796,543 that is assigned to General Electric Company, the assignee of the present invention.

It will be understood that we have described what at present are considered to be preferred embodiments of the present invention. However, it will be apparent that various modifications may be made without departing from the invention. It is therefore intended in the appended claims to cover all such changes and modifications as fall within the true spirit and scope of our invention.

What we claim as new and desire to secure by Letters Patent of the United States is:

1. Apparatus for forming insulators from a strip of insulative material for insertion into selected slots of a slotted magnetic core, the apparatus comprising: an insulator-receiving mechanism having slots corresponding to the slots of the slotted magnetic core; severing means operable to cylically sever a length from the strip of insulative material and introduce the severed length into a slot of said insulator-receiving mechanism; drive means for moving said insulator-receiving mechanism to bring said slots of said insulator-receiving mechanism sequentially in alignment with said severing means; at least first and second control mechanisms, each of said control mechanisms being effective when operative to repeatedly halt said insulator-receiving mechanism with a corresponding series of insulator-receiving slots in alignment with said severing means, the series of insulator-receiving mechanism slots related to at least one of said control mechanisms being different than the series of insulator receiver mechanism slots related to the other of said control mechanisms; and selector means effective to determine which of said at least first and second control mechanisms is operative at any given time.

2. Apparatus as set forth in claim 1 wherein: each of said control mechanisms includes a control member movable with the insulator-receiving mechanism; each control including a plurality of stops corresponding to a predetermined series of insulator-receiving slots; each of said control mechanisms also includes a detent for engaging each stop in sequence to sequentially halt said insulator-receiving mechanism with each one of the corresponding series of insulator-receiving slots in alignment with said severing means; said selector means being effective to selectively prevent at least one of said detents from engaging its associated stops.

3. A method of controlling the operational sequence of apparatus for forming insulators for insertion into selected slots of a magnetic core from a strip of insulative material wherein the apparatus includes insulator forming means comprising an insulator-forming mechanism and a power driven insulator-receiving mechanism having slots therein, and further includes at least two different disc means and a control mechanism responsive to a selected one of the at least two disc means for establishing at least two different patterns of insulators in the insulator-receiving mechanism, the method comprising: selecting from the at least two different disc means one disc means associated with formation of a given pattern of insulators, operatively interconnecting the selected one disc means and insulator forming means, and forming and placing insulators in slots of the insulator-receiving mechanism under control of the selected one disc means thereby to establish in the insulator-receiving mechanism a pattern of insulators corresponding to the given pattern.

4. The method of claim 3 wherein the insulator-receiving mechanism is rotatable relative to the insulator-forming mechanism and the selected one disc means controls the rotation of the insulator-receiving mechanism while the given pattern of insulators is being established in the insulator-receiving mechanism.

* * * * *